Sept. 13, 1927.
D. B. WILLIAMS
LOW FUEL ALARM
Filed July 23, 1923
1,642,318
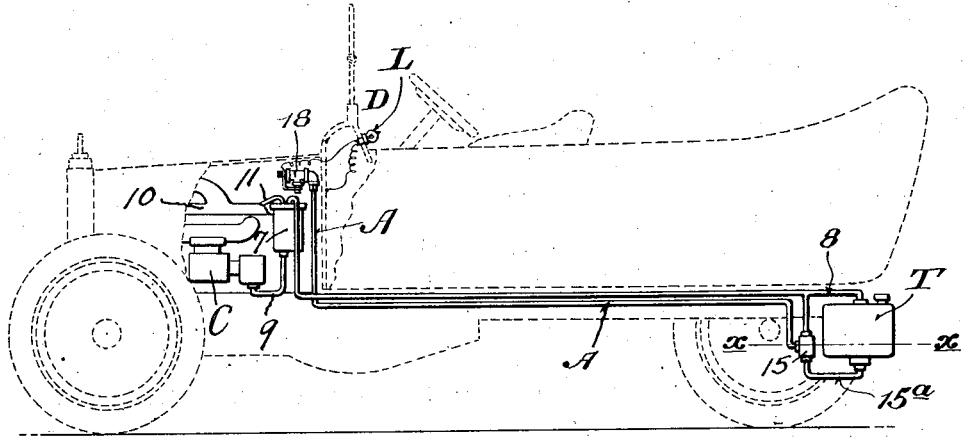
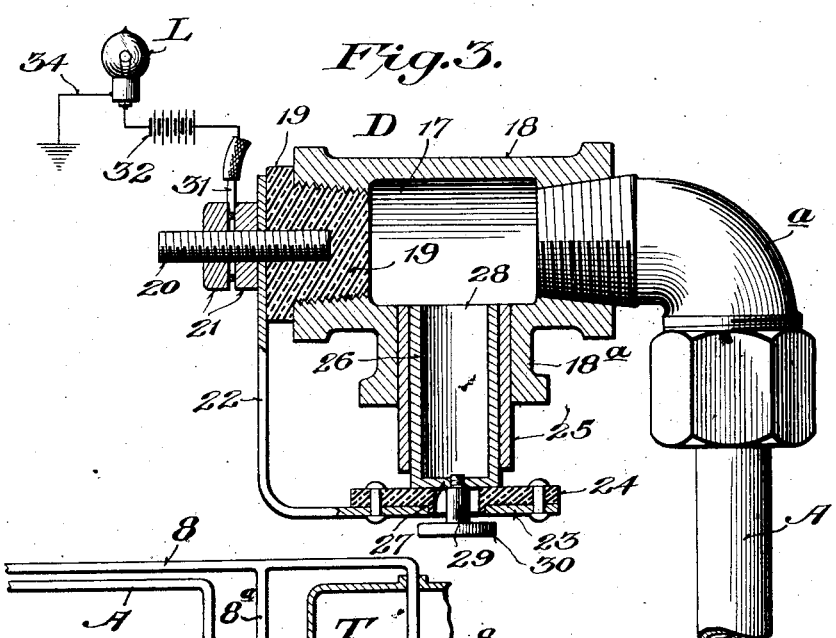
Inventor
Dick B. Williams,
WITNESSES:

Patented Sept. 13, 1927.

1,642,318

UNITED STATES PATENT OFFICE.

DICK B. WILLIAMS, OF CHICAGO, ILLINOIS, ASSIGNOR TO W. OGDEN COLEMAN, OF CHICAGO, ILLINOIS.

LOW-FUEL ALARM.

Application filed July 23, 1923. Serial No. 653,391.

This invention relates to low fuel alarms and more particularly to devices of that kind employed for indicating a predetermined low level in the gasolene tank of a motor vehicle.

To that end the invention primarily has in view a simple type of low fuel alarm capable of simple application to the ordinary fuel feed system of the conventional motor vehicle, and which is rendered active and inactive by the force employed for delivering the fuel from the tank to the carbureter, which force ordinarily is the suction induced from the operation of the motor.

Accordingly, a principal object of the invention is to provide a low fuel alarm which may be successfully operated in connection with the ordinary vacuum feed system of a motor vehicle, a well known type of such system being the Stewart vacuum feed system. In such application of the invention it is the object thereof to provide a simple construction and arrangement of parts wherein the alarm device, whether audible or visual, may merely be tapped into the fuel feed line at an elevation corresponding to the predetermined low level line for the fuel in the gasolene tank.

A more general object of the invention is to provide an alarm mechanism of the character indicated which will remain operative until the fuel tank either has been refilled or partially filled to a level above the low level line, and which vice versa will be rendered inactive or ineffective when the low level condition has been remedied.

Another object of the invention is to provide an alarm mechanism of the character described which is extremely simple in construction, it being composed of but few parts and, therefore, cheap to manufacture.

With these and other objects in view which will more readily appear as the nature of the invention is better understood, the same consists in the novel construction, combination and arrangement of parts hereinafter more fully described, illustrated and claimed.

In the accompanying drawing, in which:—

Figure 1 is an elevational view showing the vacuum feed fuel supply system having associated therewith an alarm mechanism embodying the present invention.

Figure 2 is an enlarged sectional diagram illustrating the invention disassociated from the power plant and motor vehicle.

Figure 3 is an enlarged sectional view of a form of suction controlled circuit closer that may be employed for giving a visual alarm.

Like reference numerals refer to corresponding parts throughout the figures of the drawings.

For the purpose of illustrating the simple character of the invention and its ready adaptability to the vacuum fuel supply system of a motor vehicle, there is shown more or less diagrammatically in Figure 1 of the drawings a well known type of vacuum feed fuel system which includes a fuel tank T preferably located at the rear of the car and a vacuum pump 7 usually located beneath the hood of the vehicle and connected with the tank T by a main feed line 8. The said vacuum pump 7 operates in the well known manner to intermittently draw increments of fuel from the tank T thereby to maintain an adequate fuel supply to the carbureter C through the pipe 9. The necessary suction for operating the pump 7 is obtained from the manifold of the engine 10 through the pipe 11, and due to the construction of the pump this suction intermittently acts on the liquid fuel in the tank T to elevate and feed it to the carbureter C. Thus, the pipe 8 is subject to the suction of the vacuum produced in the intake manifold as the said pipe is intermittently opened and closed by the mechanism of the pump 7.

According to the present invention it is proposed to utilize the suction occurring in the line 8 for the purpose of operating the vacuum controlled alarm unit for indicating a predetermined low level of fuel in the tank T, and to that end it is proposed to locate a suitable pipe union 15 at or about the plane of the predetermined low level $x$—$x$ of fuel in the tank T and connect said union with the tank by means of the pipe 15$^a$ as clearly shown in Figs. 1 and 2. The said pipe union 15 preferably consists of a T-connector which serves to connect the three pipes A, 8$^a$ and 15$^a$. In that way the cut-off chamber 16 of the union will be filled with fuel when the level of fuel in the tank is above a certain predetermined low point, but when the fuel drops below such level it will serve to uncover the end A' of a suction pipe A which may be connected with one end of a T-fitting 18 which constitutes a part of an alarm device designated generally as D.

For the purpose of imposing the effect of suction in the line 8 upon the chamber 16 the said line 8 is provided with a branch 8ª which also communicates with the union 15 at the top thereof so that when the liquid in the chamber 16 drops below the level of the portion A' of the pipe A the said line A will be subjected to the suction of the line 8.

Referring now more particularly to the alarm device D it will be observed that the same preferably includes a vacuum operated circuit closer which makes and breaks an electrical circuit to an indicating lamp L located on the dash of the vehicle or some other conspicuous location where the signal or indication will be flashed to the driver when the low level point is reached in the tank. While various specific forms of circuit closers or alarm controlling devices may be utilized in carrying out the invention the illustrated form shown in the drawings may be constructed in a simple manner and consists generally of the suction chamber 17 conveniently formed within a pipe T 18, and the suction pipe A may be conveniently connected with one end of the T by the elbow $a$ thereby providing direct communication between the chamber 17 and the chamber 16 of the union 15.

The opposite end of the T 18 may be closed by an insulating nut 19 which carries an outwardly extending screw 20 having a pair of clamp nuts 21 threaded thereon. Disposed between the nut 19 and the clamping nuts 21 is a supporting arm 22 of metal or other conducting material. This arm is provided with an off-set lower end portion 23 forming a stationary contact plate and secured to the upper face of this plate is a block of insulation 24. Disposed within and fixed to the depending leg 18ª of the T 18 is an open ended bearing bushing 25 and slidably mounted within the bushing for vertical movements is a piston cup 26 having a closed lower end 27 and an open upper end 28 which communicates with the suction chamber 17. The piston cup 26 and bushing 25 are loosely fitted sufficiently to permit air to slightly filter therethrough into the suction chamber 17, not sufficient however to interfere with the suction force which comes into play as herein described.

Secured to the lower end 27 of the cylinder by means of a stud 29 is a contact plate 30, the stud 29 passing through an opening conjointly formed in the insulating block 24 and the contact plate 23. The contact 30 which is carried by the plunger is normally disposed below and in spaced relation to the contact plate 23. The piston 26 normally rests upon the insulating block 24 and therefore in the normal position of this piston the contact blocks 23 and 30 are not in contact with each other. Should the suction cup be elevated, the movable contact plate 30 will engage the stationary contact plate 23.

Associated with the switch control means is an electrical circuit having a signal therein. This circuit includes a terminal wire 31 which is secured between the clamping nuts 21, a battery 32, a lamp or other indicating means L and a ground wire 34. Thus when the suction cup is elevated and the contact plate 30 engages the contact plate 23 the circuit will be closed and the lamp will be energized.

In operation, the fuel is normally drawn from the supply tank T through the feed pipe 8 and the branch pipe 8ª to the vacuum pump 7 and when the fuel chamber in the vacuum pump is filled with fuel the vacuum pump 7 ceases to function. When the fuel tank T is full, the suction pipe A will be filled with fuel up to the level of the fuel in the tank, and as the fuel in the tank is exhausted the level in the suction tube A will be correspondingly lowered. When the fuel reaches the predetermined low level point $x$—$x$ the lower end A' of the pipe A will commence to be uncovered so that the suction in the signal pipe A will increase gradually as the level of the gasoline is reduced below the said point. Consequently it will be understood that the signal will be actuated when the level of the gasoline has been so reduced below the level of the junction as to cause sufficient suction. This alarm will flash each time an increment of fuel is drawn from the tank T into the reservoir of the pump 7. When the tank T is again filled the sealing chamber or suction union 15 will also be filled and the suction pipe A will be cut off from the effects of the suction produced by the pump 7. This will immediately permit the suction cup 26 to descend by gravity and thereby break the alarm circuit.

From the foregoing it is thought that the operation and advantages of the herein described low fuel alarm will now be understood without further description, and it will also be understood that various changes in the form, proportion and minor details of construction may be resorted to without departing from the spirit of the invention or scope of the appended claims.

I claim:

1. A low fuel alarm for motor vehicles including in combination with the fuel reservoir and the vacuum feed tank of a vacuum fuel feed system, a feed pipe connecting the vacuum feed tank with said reservoir, a cut-off chamber arranged at a predetermined low level and having pipe connections with the reservoir and with the feed pipe, and a signal pipe connected with said cut-off chamber at the predetermined low level point for the fuel and provided with suction operated signal means.

2. A low level fuel alarm for motor vehicles comprising in combination with the vacuum fuel feed system of the motor including the fuel reservoir and the feed pipe connecting therewith, a signal pipe provided with suction-operated signal means and having one end arranged at the predetermined low level point for the fuel in the reservoir, and means connecting said end of the signal pipe with the said feed pipe and also with the reservoir whereby the said end of the signal pipe will be respectively sealed and unsealed by the liquid fuel according to the level in the reservoir.

3. A low level fuel alarm for motor vehicles comprising in combination with the vacuum fuel feed system of the motor including the fuel reservoir and the feed pipe connecting therewith, a T-connector including a cut-off chamber and having a pipe connection communicating with the bottom of the reservoir and a pipe connection connecting with said feed pipe, and a signal pipe provided with suction operated signal means and connecting with said T-connector at a point between said other pipe connections therewith, the connection of the signal pipe with said connector being arranged at the predetermined low level point for the fuel.

4. A low level fuel alarm for motor vehicles comprising in combination with the vacuum fuel feed system of the motor including the fuel reservoir and the feed pipe connecting therewith, a signal pipe having a fluid controlled cut-off connection with the feed pipe at the predetermined level point for the fuel, and an alarm connected with the signal pipe and including a suction chamber, a normally open electrical signal circuit and a suction influenced member constituting an element of the circuit closer.

5. A low level fuel alarm for motor vehicles comprising in combination with the vacuum fuel feed system of the motor including the fuel reservoir and the feed pipe connecting therewith, of a signal pipe having a fluid controlled cut-off connection with the feed pipe at the predetermined level point for the fuel, and an alarm connected with the signal pipe and including a suction chamber, a normally open electrical signal circuit and a suction cup communicating with said suction chamber and movable in one direction by the suction therein when the signal pipe is opened to the suction of the suction device, said suction cup constituting a circuit closing member.

In testimony whereof I hereunto affix my signature.

DICK B. WILLIAMS.